United States Patent
Su et al.

(10) Patent No.: US 9,091,558 B2
(45) Date of Patent: Jul. 28, 2015

(54) AUTONOMOUS DRIVER ASSISTANCE SYSTEM AND AUTONOMOUS DRIVING METHOD THEREOF

(71) Applicant: AUTOMOTIVE RESEARCH & TESTING CENTER, Lugang Chen, Changhua Hsien (TW)

(72) Inventors: Yi-Feng Su, Changhua Hsien (TW); Ming-Hung Li, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 44 days.

(21) Appl. No.: 14/138,148

(22) Filed: Dec. 23, 2013

(65) Prior Publication Data

US 2015/0177007 A1    Jun. 25, 2015

(51) Int. Cl.
    *G01C 22/00*     (2006.01)
    *G05D 1/00*     (2006.01)
    *G01C 21/34*     (2006.01)
    *B60W 30/00*     (2006.01)

(52) U.S. Cl.
    CPC .............. *G01C 21/34* (2013.01); *B60W 30/00* (2013.01)

(58) Field of Classification Search
    CPC ... G05D 1/0255; G05D 1/027; G05D 1/0272; G05D 1/0274; G05D 1/0278
    USPC .......................................................... 701/25
    See application file for complete search history.

(56) References Cited

U.S. PATENT DOCUMENTS

| | | | |
|---|---|---|---|
| 6,789,015 B2* | 9/2004 | Tsuji et al. | 701/301 |
| 7,065,245 B2 | 6/2006 | Toda | |
| 7,266,430 B2* | 9/2007 | Basson et al. | 701/1 |
| 7,979,172 B2* | 7/2011 | Breed | 701/23 |
| 8,195,394 B1 | 6/2012 | Zhu et al. | |
| 8,401,715 B2* | 3/2013 | Aimura et al. | 701/1 |
| 8,874,301 B1* | 10/2014 | Rao et al. | 701/25 |
| 8,977,419 B2* | 3/2015 | Lee et al. | 701/23 |
| 2001/0053955 A1* | 12/2001 | Shirai et al. | 701/200 |
| 2003/0195667 A1* | 10/2003 | Tange et al. | 701/1 |
| 2005/0102070 A1* | 5/2005 | Takahama et al. | 701/1 |
| 2005/0228555 A1* | 10/2005 | Roh et al. | 701/25 |
| 2005/0267661 A1* | 12/2005 | Iwazaki et al. | 701/41 |
| 2006/0220826 A1* | 10/2006 | Rast | 340/479 |
| 2008/0059015 A1* | 3/2008 | Whittaker et al. | 701/23 |
| 2008/0161986 A1* | 7/2008 | Breed | 701/23 |
| 2009/0192710 A1* | 7/2009 | Eidehall et al. | 701/301 |

(Continued)

FOREIGN PATENT DOCUMENTS

TW            96145498       2/2011

*Primary Examiner* — Mary Cheung
*Assistant Examiner* — Atul Trivedi
(74) *Attorney, Agent, or Firm* — patenttm.us (57) ABSTRACT

An autonomous driver assistance system is integrated with a vehicular control system to constantly detect ambient road environment of the vehicle, identify a vehicle ahead with same driving route to a destination, and follow the vehicle ahead by autonomous driving to the destination. Signals of direction indicators of the vehicle ahead can be recognized to determine a driving direction and driving state of the vehicle ahead beforehand, thereby reducing the chances of emergency brake and collision and increasing driving efficiency. Without expensive radar detection equipment, the present invention can be easily integrated with a vehicular control system to tackle the high installation cost and integration difficulty of conventional autonomous driver assistance apparatuses.

9 Claims, 12 Drawing Sheets

(56) References Cited

U.S. PATENT DOCUMENTS

| | | | |
|---|---|---|---|
| 2009/0261979 A1* | 10/2009 | Breed et al. | 340/576 |
| 2009/0306840 A1* | 12/2009 | Blenkhorn et al. | 701/16 |
| 2010/0082195 A1* | 4/2010 | Lee et al. | 701/25 |
| 2010/0228419 A1* | 9/2010 | Lee et al. | 701/25 |
| 2012/0271483 A1* | 10/2012 | Samukawa et al. | 701/1 |
| 2013/0027557 A1* | 1/2013 | Hirai et al. | 348/148 |
| 2013/0190982 A1* | 7/2013 | Nakano et al. | 701/41 |
| 2013/0345921 A1* | 12/2013 | Al-Ali et al. | 701/23 |

* cited by examiner

AUTONOMOUS DRIVER ASSISTANCE SYSTEM AND AUTONOMOUS DRIVING METHOD THEREOF

BACKGROUND OF THE INVENTION

1. Field of the Invention

The present invention relates to an autonomous driver assistance system and a method therefor, and more particularly to an autonomous driver assistance system and an autonomous driving method thereof combining road detection, autonomous driving, telematics and vehicle safety.

2. Description of the Related Art

Current vehicles have been equipped with more and more driver assistance apparatuses, such as the early passive driving assistance apparatuses including ABS (Anti-Lock Braking System), air bag, EBD (Electronic Brake Force Distribution), and the like, to provide drivers the capability of controlling the vehicles or protecting drivers' safety upon vehicle collision in an emergency braking condition. However, such passive driving assistance apparatuses still fall short as far as driving safety is concerned. To further improve driving safety and vehicle safety, active safety perception apparatuses, such as LDWS (Lane Departure Warning System), FCWS (Forward Collision Warning System) and the like, have been developed in the market one after the other to alert drivers in advance when detecting any emergency condition in front of the vehicles. The LDWS constantly detects lane or sideline markings in front of vehicles. In the event of any unintentional departure from an original lane or road border, the LDWS will trigger a warning tone to alert drivers. The drawback of the LDWS is that lane and sideline markings must be clearly recognizable. During dusky, snowy or fogy condition, the LDWS may not normally function for failing to clearly recognize lane and sideline markings. The FCWS detects a distance to a vehicle ahead through imaging or radar detection. If the distance is too close, the FCWS immediately triggers an alert or activates the brake system of the vehicle to maintain a safe driving distance or conduct an emergency stop so as to prevent vehicle crash or mitigate impact force. The drawback of the FCWS is that place of collision can never be predicted and the vehicle ahead must enter a system detection zone before the FCWS normally operates (the FCWS does not work when other vehicles are on the lateral sides of the vehicle).

The active safety perception apparatuses can only alert drivers or do an emergency stop upon departure from lane or sideline marking or imminent collision. Basically, it is still the responsibility of drivers to drive the vehicles to destinations. When the active safety perception apparatuses are applied to autonomous driving, some deficiencies appear. For example, in addition to detection of obstructions and hazards on the road, autonomous driving further requires route planning and road condition recognition.

A recently developed active safety perception apparatus as disclosed in U.S. Pat. No. 8,195,394 entitled "Object detection and classification for autonomous vehicles" is to equip a vehicle with sensors for measuring distance and for imaging, 3D radar (Three-dimensional Light Radar) and GPS (Global Positioning System) maps. The sensors are used to detect moving objects and obstacles on the roadway. The 3D radar and the GPS maps are used to avoid stationary obstacles on the roadway by the comparison with actual scenes of roadways so as to enhance the recognition of neighboring obstacles. Although the 3D radar can accurately scan topography or obstacles, the cost of the 3D radar is rather costly. Besides, a gigantic database is also required to store map information beforehand. The cost of building this active safety perception apparatus is therefore prohibitive.

Another U.S. Pat. No. 7,065,245 entitled "Image processing apparatus and the method thereof" involves a method and a device for performing a stereo matching on a pair of color images constituted by a plurality of primary colors. This conventional technique employs image recognition means to recognize signals of direction indicators and predicts a moving direction of the vehicle. However, such technique fails to disclose how to effectively recognize the signals of the direction indicators and how to combine itself with autonomous driving technique or vehicle control technique of the vehicle, making such technique not well-feathered to be combined with autonomous driving applications.

SUMMARY OF THE INVENTION

An objective of the present invention is to provide an autonomous driver assistance system and an autonomous driving method thereof capable of resolving high installation cost and integration difficulty in the conventional autonomous driver assistance apparatuses.

To achieve the foregoing objective, the autonomous driver assistance system has an autonomous driving control device, a road detection device, a telematic device, and a vehicle safety integration device.

The autonomous driving control device is adapted to connect to a vehicle control system of the vehicle for issuing an alert or controlling a travelling condition of the vehicle.

The road detection device is connected to the autonomous driving control device for acquiring a roadway image in front of the vehicle and detecting a distance to a vehicle ahead and a signal of direction indicators of the vehicle ahead.

The telematic device is connected to the autonomous driving control device for transmitting radio signals out or receiving external radio signals, planning a driving route of the vehicle and positioning the vehicle.

The vehicle safety integration device is connected to the autonomous driving control device for detecting a driving condition of a driver of the vehicle.

The road detection device determines if the roadway image has lane markings, if the lane markings are available, the telematic device controls the vehicle to drive along the lane markings to the destination by autonomous driving according to the planned driving route and the positioning of the vehicle, if the lane markings are not available, the telematic device determines if the vehicle ahead is driving along the same planned route, and if determining that the vehicle ahead follows the same planned route, the telematic device combines the autonomous driving and the positioning to drive the vehicle and follow the vehicle ahead to the destination.

To achieve the foregoing objective, the autonomous driving method has steps of:

generating a planned route to a destination;

performing road detection of the planned route to obtain roadway information in front of the vehicle including an image of lane markings, a distance to a vehicle ahead, a signal of direction indicators of the vehicle ahead, and a collision alert;

performing positioning detection to obtain an actual position of the vehicle compared with the planned route to determine if a driving route of the vehicle matches the planned route;

integrating driving safety of the vehicle to detect and determine a driving condition of a driver of the vehicle and actively control a travelling condition of the vehicle upon autonomous driving; and performing the autonomous driving to determine if the image of the lane markings has lane markings, if the lane markings are available, controlling the vehicle to drive along the lane markings to the destination by the autonomous driving according to the steps of generating the planned route and performing road detection of the planned route, if the lane markings are not available, detecting if the vehicle ahead is driving along the same planned route, and if determining that the vehicle ahead follows the same planned route, combining the autonomous driving and the positioning detection to drive the vehicle and follow the vehicle ahead to the destination.

The foregoing autonomous driver assistance system is integrated with a vehicular control system. The telemetic device positions the vehicle and compares the detected position of the vehicle with a planned driving route. The road detection device constantly detects an ambient road environment of the vehicle. The autonomous driving control device identifies a vehicle ahead with an identical driving route to a destination, automatically follows the vehicle ahead to drive to the destination, and determines a driving state of the vehicle ahead in advance according to the signal of the direction indicators of the vehicle ahead so as to reduce the possibility of emergency and collision and increasing driving efficiency. The vehicle safety integration device detects a driving condition of the driver. In the event of emergency (for example, the driver is unconscious), the autonomous driving control device forcibly takes control of driving the vehicle, and the telemetic device issues signals for rescue. Without expensive radar detection equipment, the present invention is integratable with a vehicular control system to fully achieve autonomous driving, thereby getting rid of the issues of high installation cost and integratable difficulty of conventional autonomous driver assistance system.

Other objectives, advantages and novel features of the invention will become more apparent from the following detailed description when taken in conjunction with the accompanying drawings.

DETAILED DESCRIPTION OF THE INVENTION

Figure 1:
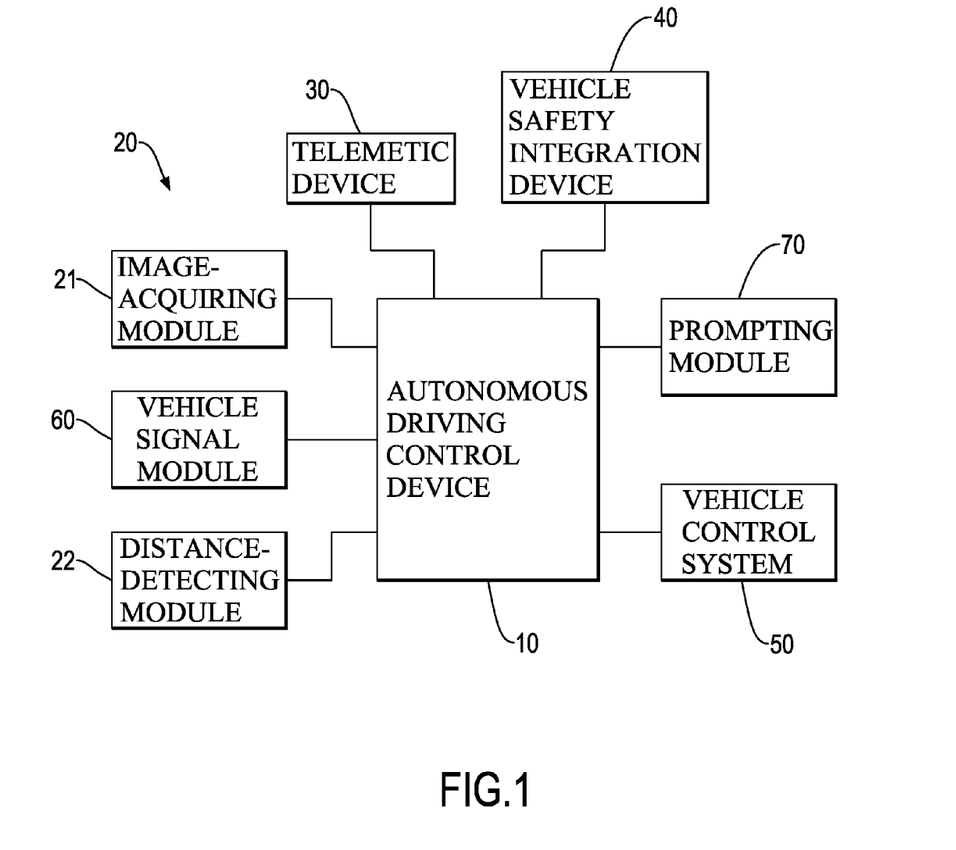
FIG. 1 is a functional block diagram of an autonomous driver assistance system in accordance with the present invention.

With reference to FIG. 1, an autonomous driver assistance system in accordance with the present invention is mounted on a vehicle, and has an autonomous driving control device 10, a road detection device 20, a telemetic device 30, and a vehicle safety integration device 40.

The autonomous driving control device 10 is connected to the road detection device 20, the telemetic device 30 and the vehicle safety integration device 40, and is further connected to a vehicle control system 50 and a vehicle signal module 60. The vehicle control system 50 controls an accelerator and a brake of the vehicle. The vehicle signal module 60 acquires vehicle signals, such as signals for acceleration, steering, braking, or throttle control.

The autonomous driving control device 10 acquires the vehicle signals from the vehicle signal module 60, and issues an alert through a prompting device 70 connected with the autonomous driving control device 10 or actively controls the brake or accelerator of the vehicle through the vehicle control system 50 to move the vehicle forward or stop the vehicle after combining and calculating the vehicle signals. In the present embodiment, the autonomous driving control device 10 is a micro-controller unit (MCU) or a digital signal processor (DSP), and the vehicle control system 50 is an electronic control unit (ECU). The autonomous driving control device may be further integrated in the vehicle control system 50.

The road detection device 20 detects a distance to a vehicle ahead, detects signals of direction indicators of the vehicle ahead, and has an image-acquiring module 21 and a distance-detecting module 22. The image-acquiring module 21 acquires a roadway image in front of the vehicle. The road detection device 20 then recognizes the vehicle ahead, direction indicators of the vehicle ahead or obstacles (such as curb fender or roadside barrier) according the acquired image. The distance-detecting module 22 detects a distance between the vehicle and the vehicle ahead. In the present embodiment, the image-acquiring module 21 is a camera mounted on a front portion of the vehicle or on the windshield to take an image of a road scene in front of the vehicle. The distance-measuring module 22 is mounted on the front portion of the vehicle and uses ultrasonic wave, milli-wave or 2D Lidar (Two-dimensional Light Detection and Ranging) for distance detection.

The telemetic device 30 serves to transmit radio signals out or receive external radio signals, and is built in with electronic maps to plan driving routes of the vehicle. The radio signals include GPS signals and Assisted GPS (AGPS) signals. The telemetic device 30 identifies coordinates of the vehicle according to received radio signals, compares the coordinates with a driving route planned on the electronic maps, and wirelessly communicates with a monitoring and control center or an emergency center to report a position of the vehicle and a driving condition of a driver of the vehicle.

The vehicle safety integration device 40 serves to detect the driver's driving condition, such as in a drowsy, unconscious or drunk state, with an on-board camera or a physiological monitoring module, and transmit signals out through the telemetic device 30.

Figure 2:
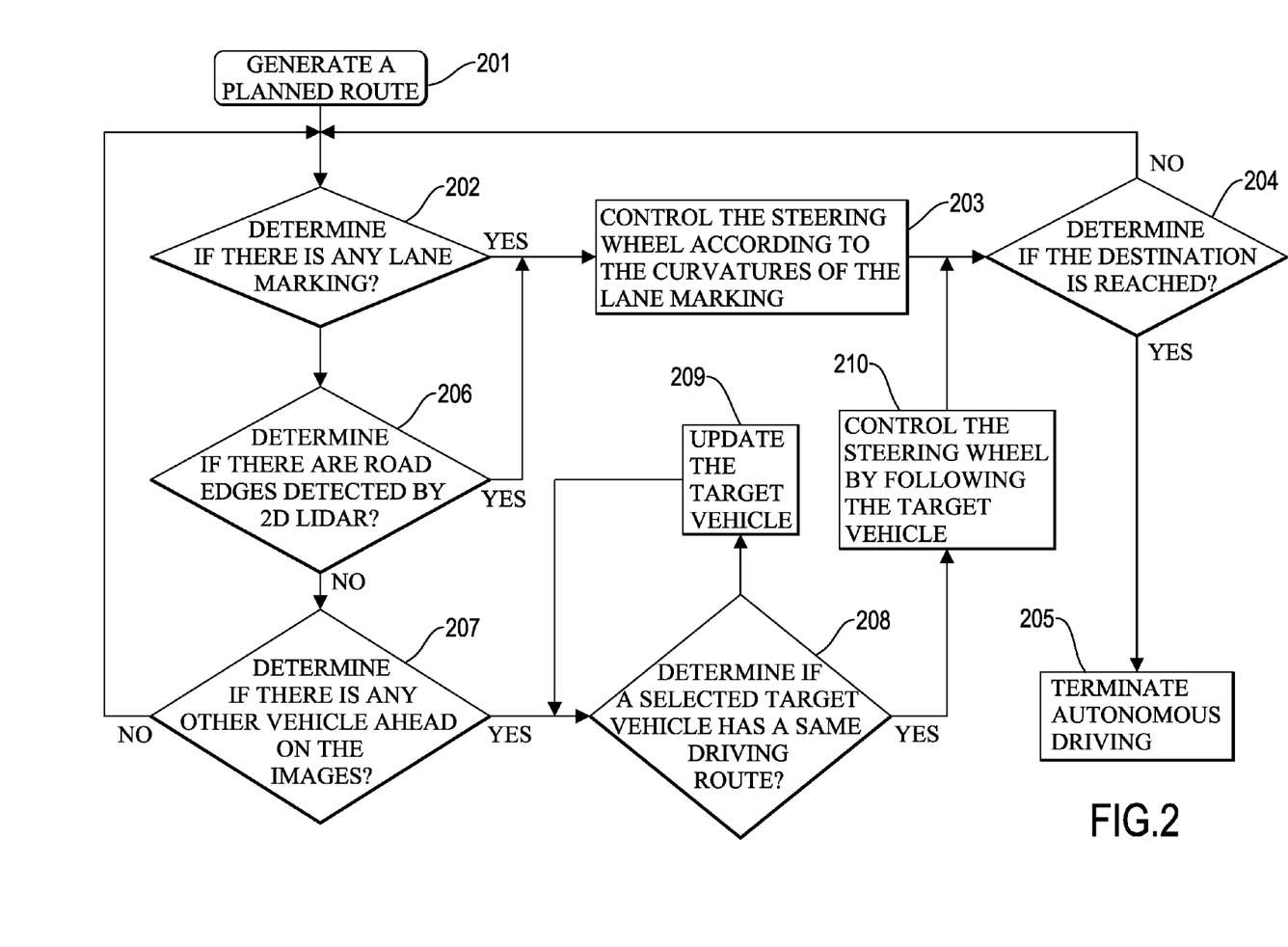
FIG. 2 is a flow diagram of an autonomous driving method in accordance with the present invention.

With reference to FIG. 2, an autonomous driving method is performed by the autonomous driving control device 10, and has the following steps.

Step 201: Generate a planned route to a destination.

Step 202: Determine if there is any lane marking (or sideline marking) according to images of road scenes along the planned route taken by the road detection device 20. If positive, perform Step 203. If negative, perform Step 206.

Step 203: Control the steering wheel according to the curvatures of the directions of the lane marking (vehicle-moving direction).

Step 204: Determine if the destination is reached. If positive, perform Step 205. If negative, perform Step 202.

Step 205: Terminate autonomous driving.

Step 206: Determine if there are road edges (or sideline markings) that are detected by the distance-detecting module 22 (2D Lidar). If positive, resume Step 203. If negative, perform Step 207.

Step 207: Determine if there is any other vehicle on the images acquired by the image-acquiring module 21 (camera). If negative, resume Step 202. If positive, perform Step 208.

Step 208: Select a vehicle as a target vehicle and determine if the target vehicle has a same driving route. If positive, perform Step 210. If negative, perform Step 209.

Step 209: Update the target vehicle by selecting another vehicle having the same driving route as the target vehicle.

Step 210: Control the steering wheel (vehicle-moving direction) according to the driving route of the target vehicle.

Figure 3:
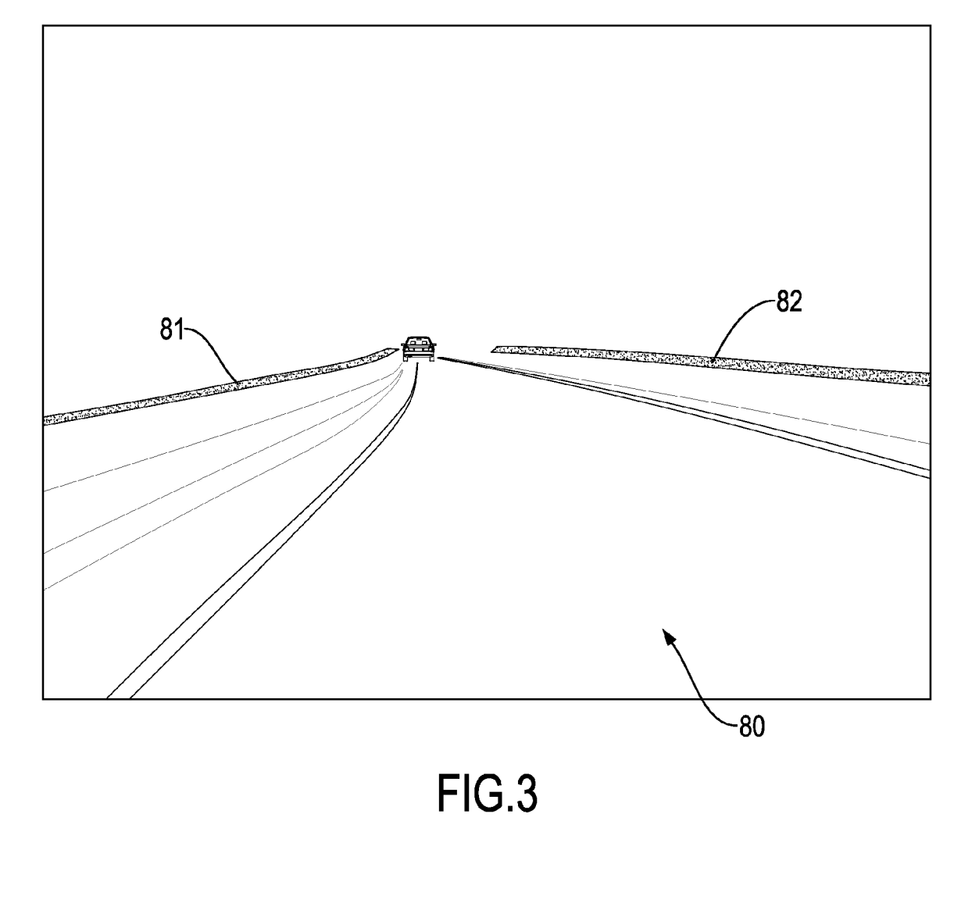
FIG. 3 is a schematic image of a roadway and road borders in accordance with the present invention.
Figure 4:
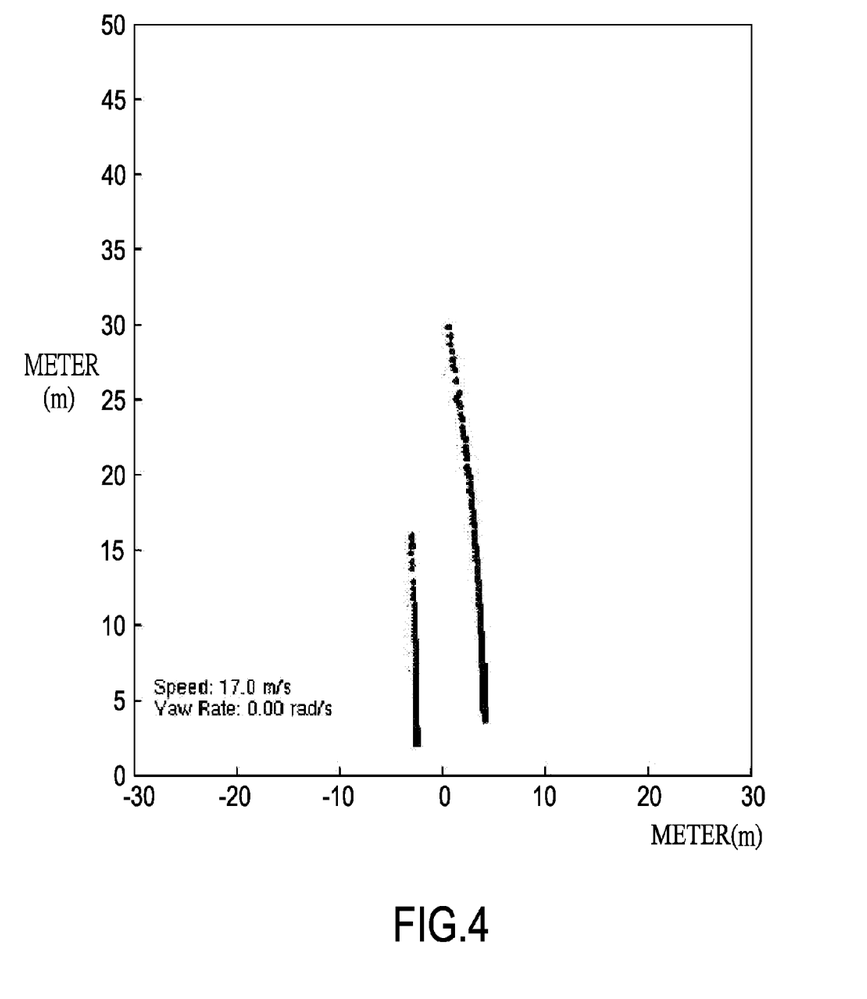
FIG. 4 is a graph showing a detection result of road borders in accordance with the present invention.

With reference to FIG. 3, a road image acquired by the image-acquiring module 21 of the road detection device 20 is shown, and includes a roadway and two sideline markings 81, 82 of a road 80. The sideline markings 81, 82 are bent as the road 80 winds and are curved. The sideline markings 81, 82 on FIG. 3 are recognized by the road detection device 20 and a recognition result of the sideline markings 81, 82 is shown on FIG. 4. An X axis along a horizontal direction on FIG. 4 represents a left side and a right side of the vehicle. A center point (zero meter) corresponds to a mounting position of the image-acquiring module 21 in the vehicle. A right side relative to the center point of the X axis corresponds to the right side of the vehicle, and a left side relative to the center point of the X axis corresponds to the left side of the vehicle. A Y axis represents a distance of the road extending forwards from the vehicle. The two curves shown on FIG. 4 correspond to the sideline markings 81, 82 on FIG. 3. It is noted that the curve on the right corresponds to the sideline marking 82 on the right of the vehicle (approximately 30 meters in length) and is bent to the left, and the curve on the left corresponds to the sideline marking 81 on the left of the vehicle (approximately 15 meters in length) and is slightly bent to the left.

Figure 5:
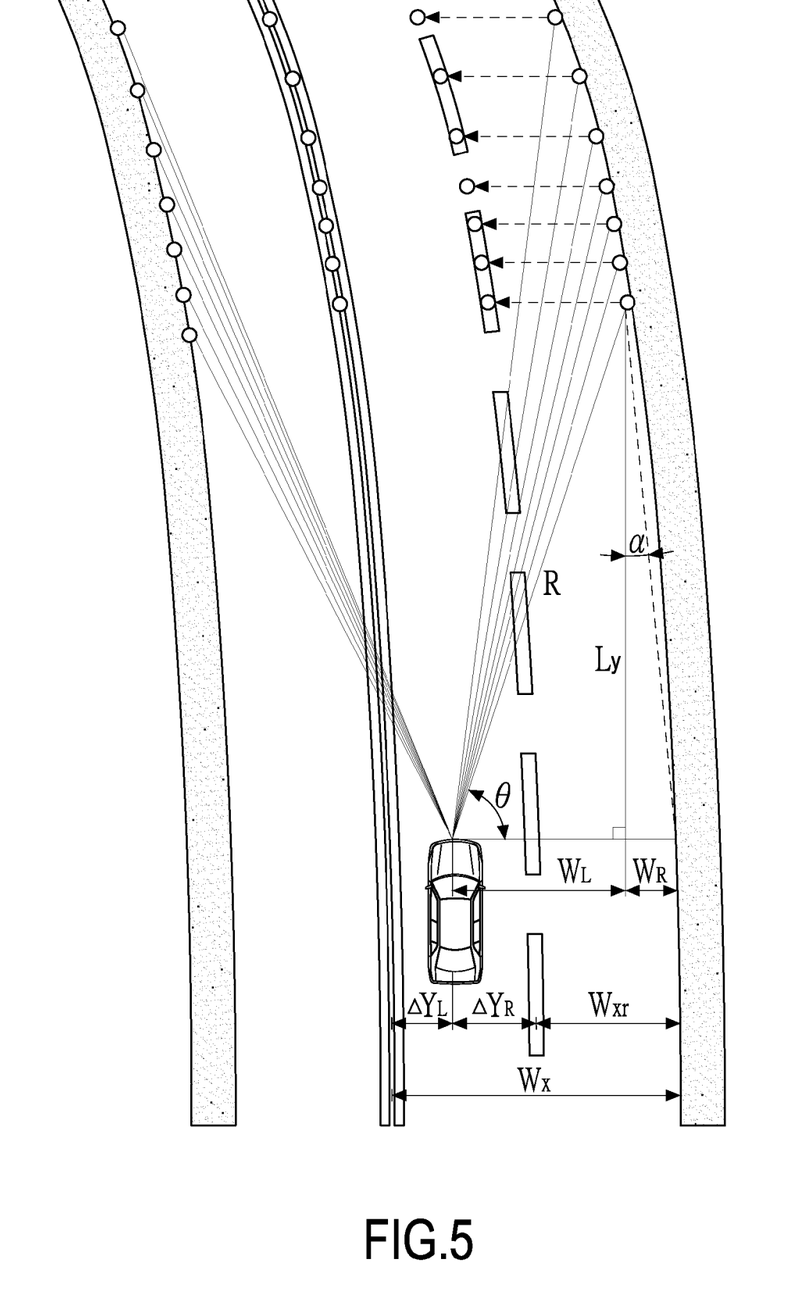
FIG. 5 is a schematic diagram showing calculation curvatures of directions of a road in accordance with the present invention.

With reference to FIG. 5, after the road detection device 20 acquires the recognition result of the sideline markings 81, 82, as disclosed in Taiwan Patent No. 096145498 entitled "Method and device for detecting lane sway and departure", a turning angle of the steering wheel tan(α) can be calculated according to a curvature of the sideline marking or a lane marking and is expressed as follows.

$L_y = R \times \sin \theta$ $W_L = R \times \cos \theta$ $W_R = L_y \times \tan \alpha = R \times \sin \theta \times \tan \alpha$ Radius of curvature: $\rho = \frac{1}{\alpha}$ Turning angle: $\tan(\alpha) = \frac{L_y}{\rho}$ Second-order curve of sideline marking: $x = k_w \times y^2 + m_w \times y + b_w$ Curvature of sideline marking $\alpha = \frac{2 \times k_w}{(1 + (2 \times k_w \times y + m_w)^2)^{\frac{3}{2}}}$ Distances from a sideline marking to left and right lane markings beside the vehicle:

$W_{x_r} = W_L + W_R - \Delta Y_R$ $W_x = W_L + W_R - \Delta Y_L$

Second-order curve of left and right lane markings beside the vehicle:

$x_R = k_w \times y^2 + m_w \times y + (b_w - W_{x_r})$ $x_L = k_w \times y^2 + m_w \times y + (b_w - W_x)$ Where $k_w$, $m_w$ and $b_w$ are coefficients of a second-order curve of the lane marking, which are obtained from the image detection;

x, y are actual coordinates of the second-order curve of the lane marking in a lateral axis and a longitudinal axis;

α represents a curvature of the lane marking;

ρ represents a radius of curvature;

$L_y$ represents a longitudinal distance from the vehicle to the lane marking;

R is a distance from a head of the vehicle to the lane marking;

θ is included between a direction from the head of the vehicle to the lane marking and a lateral direction;

Tan(α) is the turning angle of the steering wheel.

Figure 6A:
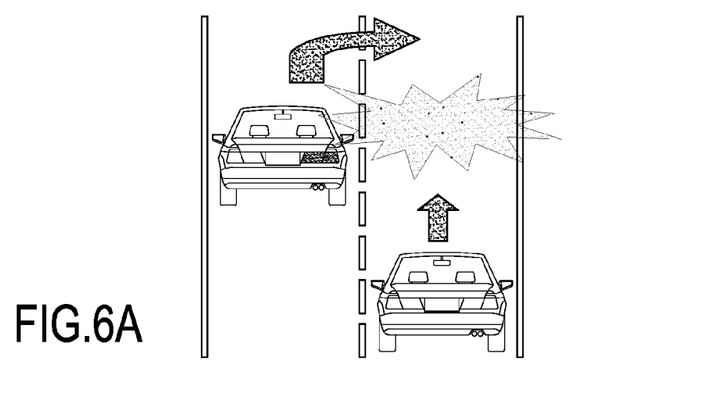
FIGS. 6A, 6B and 6C are schematic views showing ways for two vehicles on different lanes to maintain a safe distance in accordance with the present invention.
Figure 6B:
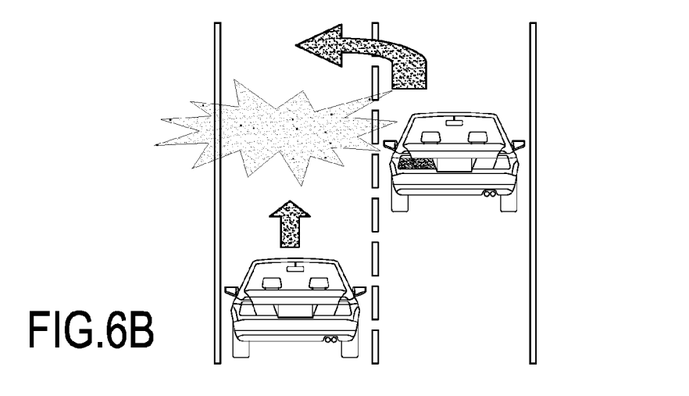
Figure 6C:
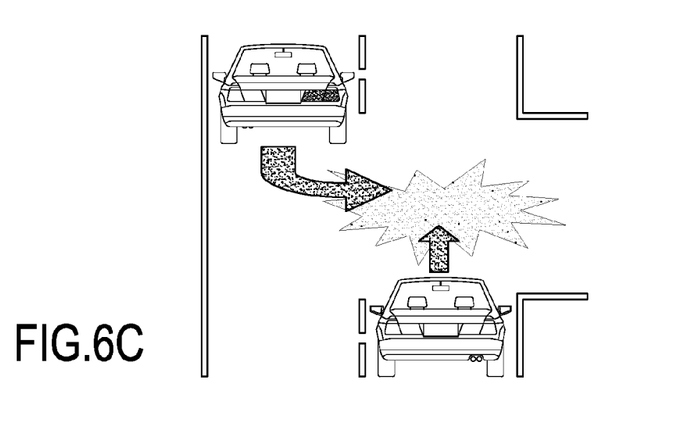
Figure 7A:
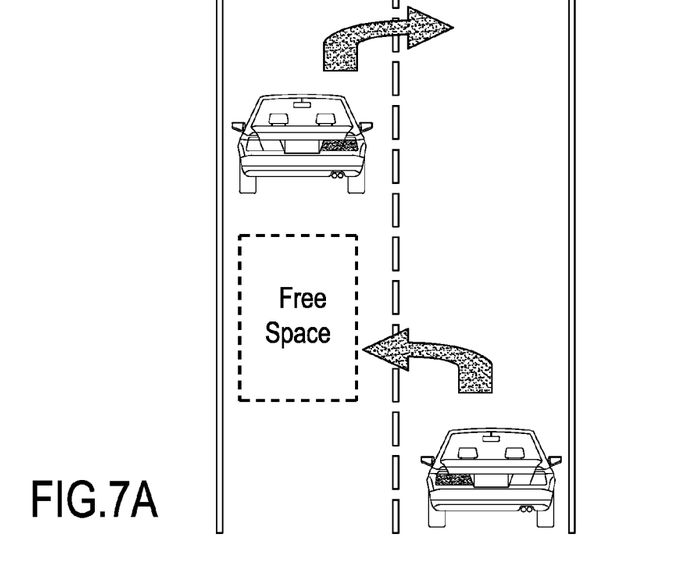
FIGS. 7A and 7B are schematic views showing ways for two vehicles on different lanes to change lane in accordance with the present invention.
Figure 7B:
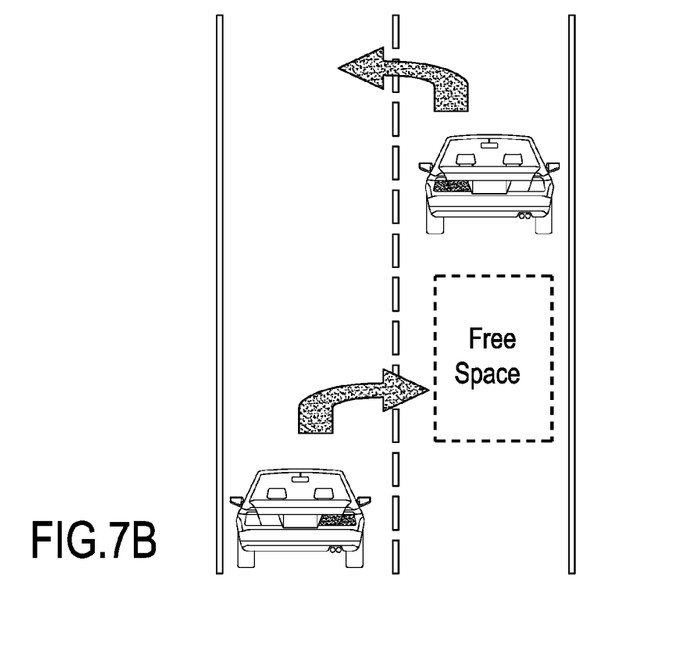

With reference to FIGS. 6A, 6B, 6C, 7A and 7B, the road detection device 20 predicts a possible collision distance and time of the vehicle after recognizing a distance between the vehicle and a vehicle ahead and further analyzing a risk of a moving direction and a moving speed of the vehicle. With reference to FIGS. 6A and 6B, when the vehicle ahead abruptly cuts into the lane in front of the vehicle from other lane (left or right lane) and a safe distance is not kept, the road detection device 20 determines a signal of the direction indicators of the vehicle for the autonomous driving control device 10 to instruct the prompting module 70 to issue an alert, and the control system 50 activates an timely braking action to prevent the vehicle from hitting the vehicle ahead from behind With reference to FIG. 6C, when a vehicle ahead in the opposite lane makes a left turn to change to the lane in front of the vehicle, the autonomous driving control device 10 instructs the prompting module 70 immediately issue an alert and the control system 50 generates a braking action to prevent direct collision with the oncoming vehicle. With reference to FIGS. 7A and 7B, when enough space and safe distance is available is available in the left or right lane ahead of the vehicle for lane change, if the vehicle ahead abruptly changes to the lane on which the vehicle is, the autonomous driving control device 10 can also change to the left or right lane in consideration of reducing braking frequency, thereby increasing driving efficiency and saving gas consumption.

Figure 8:
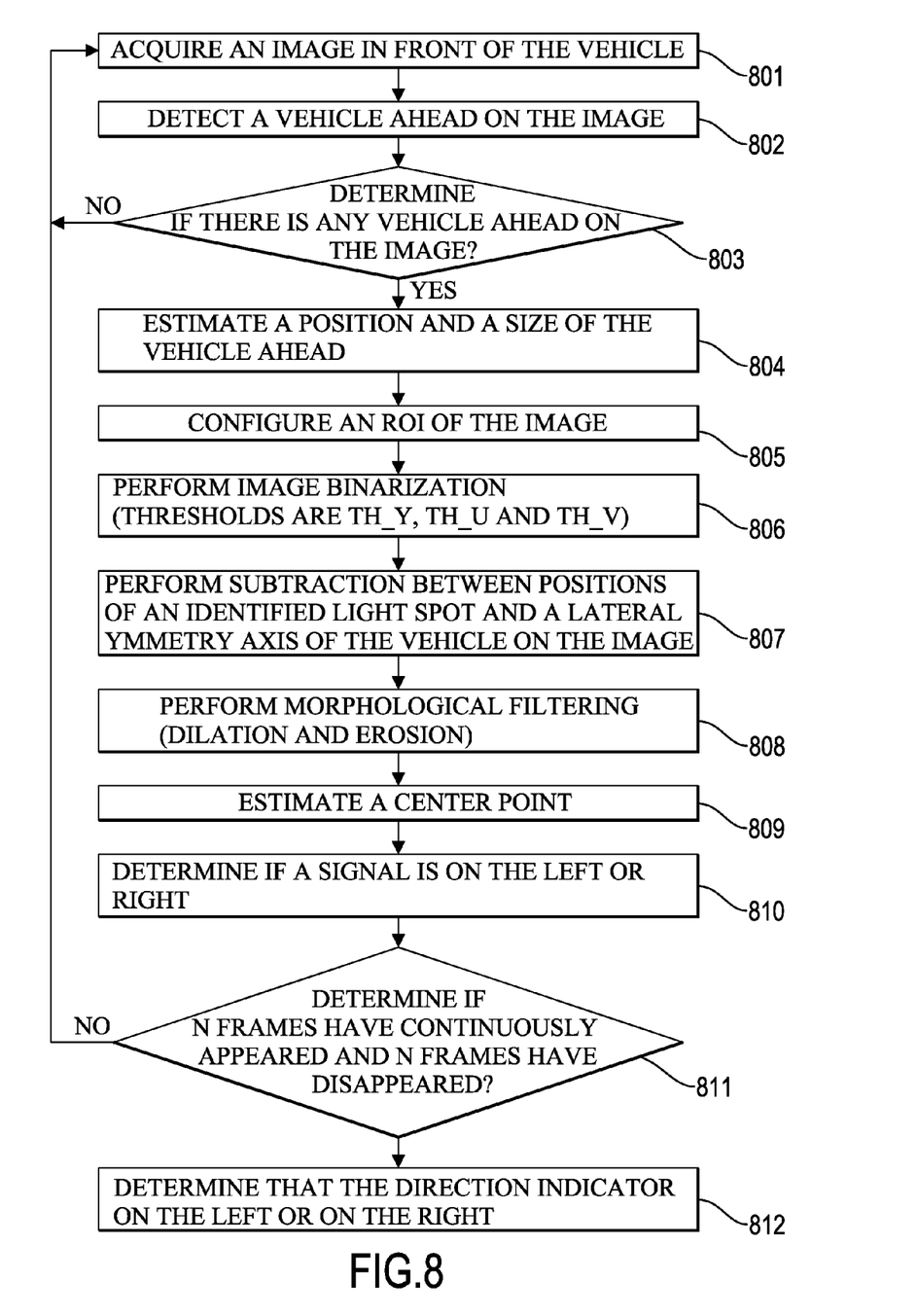
FIG. 8 is a flow diagram of a method for recognizing signals of direction indicators in accordance with the present invention.

With reference to FIG. 8, the road detection device 20 recognizes a signal of a vehicle ahead by performing the following steps.

Step 801: Acquire an image in front of the vehicle.
Step 802: Detect a vehicle ahead on the image.
Step 803: Determine if there is any vehicle ahead on the image. If negative, resume Step 801. If positive, perform Step 804.
Step 804: Estimate a position and a size (height and width) of the vehicle ahead.
Step 805: Configure an ROI (Region of interest) of the image.
Step 806: Perform image binarization (thresholds are Th_Y, Th_U and Th_V corresponding to different tail lights).
Step 807: Perform subtraction between positions of an identified light spot and a lateral symmetry axis of the vehicle on the image;
Step 808: Perform morphological filtering (dilation and erosion).
Step 809: Estimate a center point.
Step 810: Determine if a signal is on the left or right.
Step 811: Determine if n frames have continuously appeared and n frames have disappeared. If negative, resume Step 801. If positive, perform Step 812.
Step 812: Determine that the direction indicator on the left or on the right of the vehicle ahead sends out a signal.

As the direction indicators of vehicles in the current market are mostly in orange color, in light yellow or in red. As to the thresholds in Step 806, the Th_Y may be set to a value in a range of 235~250 and is 246 preferably, the Th_U may be set to a value in a range of 95~115 and is 108 preferably, and the th_V may be set to a value in a range of 120~140 and is 130 preferably. As the direction indicators of vehicles are mounted in bilateral symmetry, only one direction indicator on one side flashes at a time when vehicles change lane. Flashing direction indicators on the left and right sides signals a vehicle failure. Hence, only the flashing direction indicator on one side needs to be recognized. Furthermore, as being once or twice per second, the flashing rate of current direction indicators can be used to calculate the number of the foregoing frames.

Figure 9:
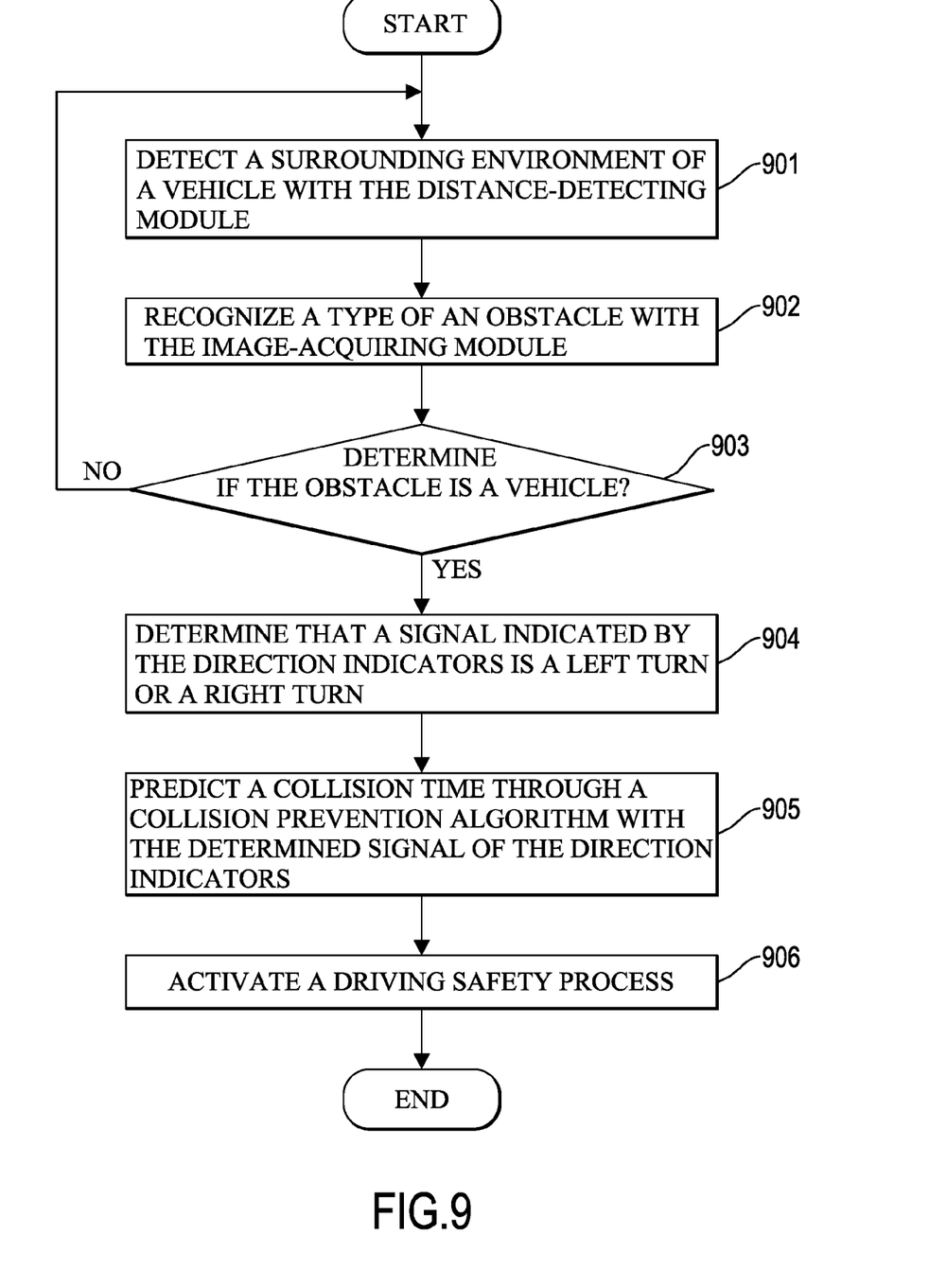
FIG. 9 is a flow diagram of a method for detecting collision time of vehicles in accordance with the present invention.

With reference to FIG. 9, the road detection device 20 predicts a collision distance and a collision time by performing the following steps.

Step 901: Detect a surrounding environment of a vehicle with the distance-detecting module 22.
Step 902: Recognize a type of an obstacle with the image-acquiring module 21.
Step 903: Determine if the obstacle is a vehicle. If negative, resume Step 901. If positive, perform Step 904.
Step 904: Determine if a signal indicated by the direction indicators signal is a left turn or a right turn.
Step 905: Predict a collision time through a collision prevention algorithm after determining the signal of the direction indicators.
Step 906: Activate a driving safety mechanism through the autonomous driving control device 10 and control the vehicle through control system 50.

Figure 10:
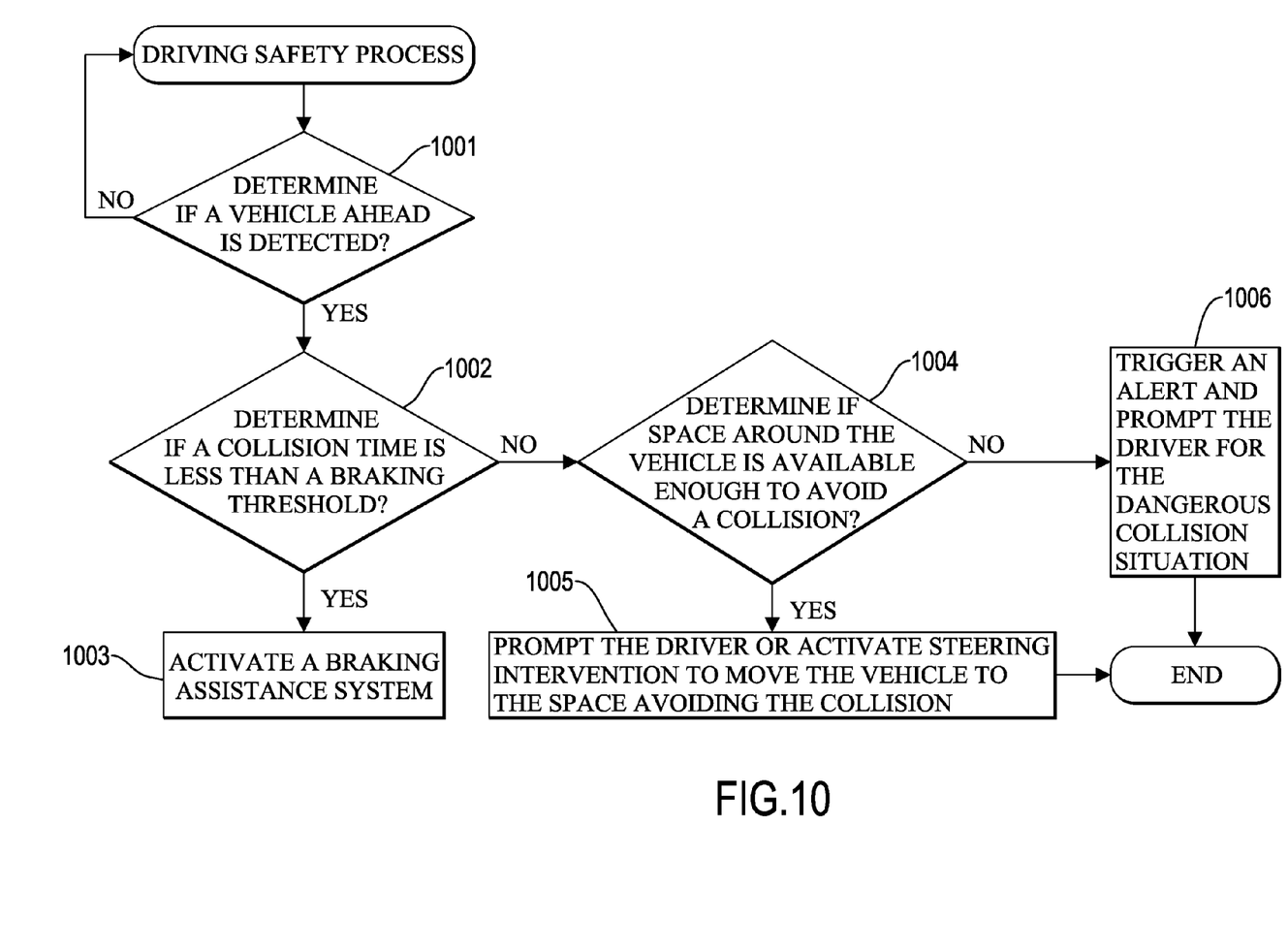
FIG. 10 is a flow diagram of a safe driving mechanism in accordance with the present invention.

With reference to FIG. 10, the autonomous driving control device 10 activates the driving safety mechanism by performing the following steps.

Step 1001: Determine if a vehicle ahead is detected. If negative, resume Step 1001. If positive, perform Step 1002.

Step 1002: Determine if a collision time is less than a braking threshold. If positive, perform step 1003. If negative, perform Step 1004.
Step 1003: Activate a braking assistance system.
Step 1004: Determine if enough space around the vehicle is available to avoid a collision. If positive, perform step 1005. If negative, perform Step 1006.
Step 1005: Prompt the driver or activate steering intervention to move the vehicle to the space avoiding the collision.
Step 1006: Trigger an alert and prompt the driver for the dangerous collision situation.

Figure 11:
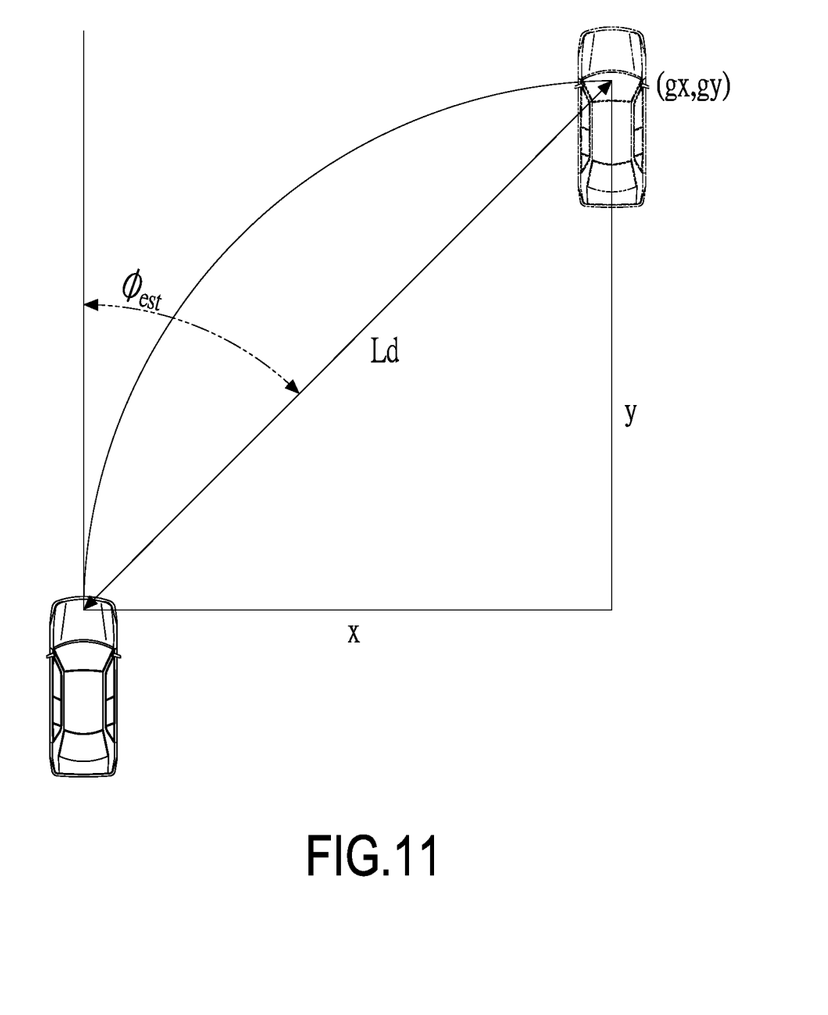
FIG. 11 is a schematic view showing a predicated lane-changing target position in accordance with the present invention.
Figure 12:
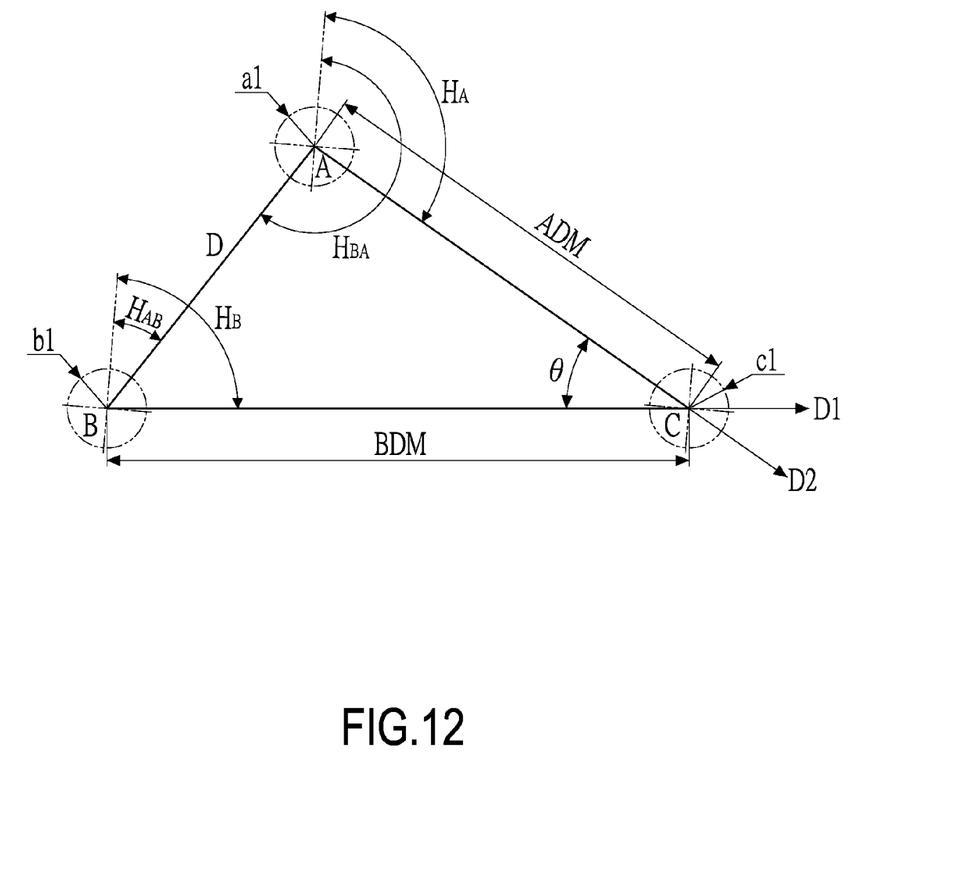
FIG. 12 is another schematic view showing the predicated lane-changing target position in accordance with the present invention.

With reference to FIGS. 11 and 12, the foregoing estimated lane-changing target position can be calculated by the following equation.

$$\phi_{est} = \frac{\pi}{2} - \operatorname{atan}\left(\frac{y}{x}\right)$$

where
gx, gy are coordinates of the target position;
x is a width of a lane;
y is an estimated lateral moving distance; and
is an estimated moving direction.

With further reference to FIG. 12, the estimated moving direction is added to a moving direction estimated by a tracking algorithm to obtain a final moving direction $\emptyset_{new} = \phi \pm$. The final moving direction is substituted into $$t_{ADM} = \frac{ADM}{V_A}$$

and $$t_{BDM} = \frac{BDM}{V_B}$$

to obtain the estimated collision time for higher accuracy of predication, where ADM represents a distance from a vehicle A to a collision point C, BDM represents a distance from another vehicle B to the collision point C, $V_A$ represents a speed of the vehicle A, $V_B$ represents a speed of the vehicle A, $t_{ADM}$ represents a time for the vehicle A to reach the collision point C, $t_{ADM}$ represents a time for the vehicle A to reach the collision point C, $t_{BDM}$ represents a time for the vehicle B to reach the collision point C, $e_A$ represents an error range for the vehicle A, $e_B$ represents an error range for the vehicle B, $H_A$ represents a heading angle of the vehicle A, $H_B$ represents a heading angle of the vehicle B, $H_{AB}$ represents an angle of the vehicle A relative to vehicle B, $H_{BA}$ represents an angle of the vehicle B relative to vehicle A, D is a direct distance between the vehicles A and B, D1 is a driving direction of the vehicle B, D2 is a driving direction of the vehicle A, and θ is an angle formed by extending from the collision point to the vehicles A and B.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An autonomous driving method performed by an autonomous driver assistance system mounted in a vehicle, the method comprising steps of:
   generating a planned route to a destination;
   performing road detection of the planned route to obtain roadway information in front of the vehicle including an image of lane markings, a distance to a vehicle ahead, a signal of direction indicators of the vehicle ahead, and a collision alert;
   performing positioning detection to obtain an actual position of the vehicle compared with the planned route to determine if a driving route of the vehicle matches the planned route;
   integrating driving safety of the vehicle to detect and determine a driving condition of a driver of the vehicle and actively control a travelling condition of the vehicle upon autonomous driving; and
   performing the autonomous driving to determine if the image of the lane markings has lane markings, if the lane markings are available, controlling the vehicle to drive along the lane markings to the destination by the autonomous driving according to the steps of generating the planned route and performing road detection of the planned route, if the lane markings are not available, detecting if the vehicle ahead is driving along the same planned route, and if determining that the vehicle ahead follows the same planned route, combining the autonomous driving and the positioning detection to drive the vehicle and follow the vehicle ahead to the destination.

2. The autonomous driving method as claimed in claim 1, wherein after the lane markings of the image are recognized, a turning angle of a steering wheel of the vehicle is calculated according to a curvature of one of the lane markings by the following equations;

$$x = k_w \times y^2 + m_w \times y + b_w$$

$$\alpha = \frac{2 \times k_w}{(1 + (2 \times k_w \times y + m_w)^2)^{\frac{3}{2}}}$$

$$\rho = \frac{1}{\alpha}$$

$$L_y = R \times \sin \theta$$

$$\tan(\alpha) = \frac{L_y}{\rho}$$

where
$k_w$, $m_w$ and $b_w$ are coefficients of a second-order curve of the lane marking;
x, y are actual coordinates of the second-order curve of the lane marking in a lateral axis and a longitudinal axis;
$\alpha$ represents a curvature of the lane marking;
$\rho$ represents a radius of curvature;
$L_y$ represents a longitudinal distance from the vehicle to the lane marking;
R is a distance from a head of the vehicle to the lane marking;
$\theta$ is included between a direction from the head of the vehicle to the lane marking and a lateral direction;
$\tan(\alpha)$ is the turning angle of the steering wheel.

3. The autonomous driving method as claimed in claim 2, wherein the signal of the direction indicators of the vehicle ahead is recognized by steps of:
   acquiring an image in front of the vehicle;
   detecting a vehicle ahead on the image;
   estimating a position and a size of the vehicle ahead;
   configuring an ROI (Region of interest) of the image;
   performing image binarization on the ROI;
   performing subtraction between positions of an identified light spot and a lateral symmetry axis of the vehicle on the image
   performing morphological dilation or erosion filtering;
   estimating a center point;
   determining if the signal is on the left or right of one of the direction indicators of the vehicle ahead; and
   determining if n frames have continuously appeared and n frames have disappeared, and if positive, determining that the direction indicator on the left or on the right of the vehicle ahead sends out the signal.

4. The autonomous driving method as claimed in claim 3, wherein the autonomous driver assistance system acquires a collision time and a collision distance by performing steps of:
   detecting a surrounding environment of a vehicle with the distance-detecting module;
   determining if a signal indicated by the direction indicators signal is a left turn or a right turn;
   predicting a collision time through a collision prevention algorithm after determining the signal of the direction indicators; and
   activating a driving safety mechanism to control the vehicle.

5. The autonomous driving method as claimed in claim 4, wherein the driving safety mechanism has steps of:
   determining if a time to collide with the vehicle ahead is less than a braking threshold, if positive, activating a braking assistance system, and if negative, determining if enough space around the vehicle is available to avoid a collision; and
   prompting the driver or activating steering intervention to move the vehicle to the space for avoiding the collision.

6. The autonomous driving method as claimed in claim 5, wherein when detecting and determining that the driver of the vehicle is in an unconscious state, an autonomous steering intervention is activated.

7. An autonomous driver assistance system mounted on a vehicle and comprising:
   an autonomous driving control device adapted to connect to a vehicle control system of the vehicle for issuing an alert or controlling a travelling condition of the vehicle;
   a road detection device connected to the autonomous driving control device for acquiring a roadway image in front of the vehicle and detecting a distance to a vehicle ahead and a signal of direction indicators of the vehicle ahead;
   a telematic device connected to the autonomous driving control device for transmitting radio signals out or receiving external radio signals, planning a driving route of the vehicle and positioning the vehicle; and
   a vehicle safety integration device connected to the autonomous driving control device for detecting a driving condition of a driver of the vehicle;
   wherein the road detection device determines if the roadway image has lane markings, if the lane markings are available, the telematic device controls the vehicle to drive along the lane markings to the destination by autonomous driving according to the planned driving route and the positioning of the vehicle, if the lane markings are not available, the telemetic device detects if the vehicle ahead is driving along the same planned route, and if determining that the vehicle ahead follows the same planned route, the telemetic device combines the autonomous driving and the positioning to drive the vehicle and follow the vehicle ahead to the destination.

8. The autonomous driver assistance system as claimed in claim 7, wherein the autonomous driving control device is adapted to acquire vehicle signals from a vehicle signal module, and issue an alert through a prompting device connected with the autonomous driving control device or actively controls a brake or an accelerator of the vehicle through the vehicle control system to move the vehicle forward or stop the vehicle after combining and calculating the vehicle signals.

9. The autonomous driver assistance system as claimed in claim 7, wherein the road detection device has:
   an image-acquiring module acquiring the roadway image in front of the vehicle for the road detection device to recognize the vehicle ahead and the direction indicators of the vehicle ahead according the acquired road image; and
   a distance-detecting module detecting a distance between the vehicle and the vehicle ahead.

\* \* \* \* \*